United States Patent
Rawlings et al.

(10) Patent No.: US 9,567,002 B2
(45) Date of Patent: Feb. 14, 2017

(54) STEERING SYSTEMS INCLUDING LOCKING CONTROLS FOR A MOTOR VEHICLE, AND MOTOR VEHICLES INCLUDING STEERING SYSTEMS

(71) Applicant: FORD GLOBAL TECHNOLOGIES, LLC, Dearborn, MI (US)

(72) Inventors: Jeremy Alan Rawlings, Canton, MI (US); Oliver Nehls, Düsseldorf (DE); Lodewijk Wijffels, Canton, MI (US); Joshua Guerra, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 14/639,547

(22) Filed: Mar. 5, 2015

(65) Prior Publication Data
US 2016/0257338 A1 Sep. 8, 2016

(51) Int. Cl.
- B62D 6/00 (2006.01)
- B62D 15/02 (2006.01)
- B62D 3/02 (2006.01)

(52) U.S. Cl.
CPC ............... B62D 6/001 (2013.01); B62D 3/02 (2013.01); B62D 15/027 (2013.01)

(58) Field of Classification Search
CPC .................................. B62D 6/001; B62D 3/02
See application file for complete search history.

(56) References Cited

U.S. PATENT DOCUMENTS

| | | |
|---|---|---|
| 4,659,969 A | 4/1987 | Stupak, Jr. |
| 5,450,769 A | 9/1995 | Hu et al. |
| 5,467,244 A | 11/1995 | Jayawant et al. |
| 6,840,347 B2 * | 1/2005 | Nakatsu ............... B62D 5/008 180/444 |
| 7,004,281 B2 | 2/2006 | Hidaka |
| 7,243,570 B2 | 7/2007 | Kuehnhoefer et al. |
| 8,122,963 B2 | 2/2012 | Davis |

(Continued)

FOREIGN PATENT DOCUMENTS

| | | |
|---|---|---|
| JP | 2006-160052 A | 6/2006 |
| JP | 2009-113756 A | 5/2009 |

OTHER PUBLICATIONS

U.S. Appl. No. 14/077,600, entitled "Active Front Steering System Lock," filed Nov. 12, 2013.

*Primary Examiner* — Faye M Fleming
(74) *Attorney, Agent, or Firm* — Jones Robb, PLLC; Raymond L. Coppiellie

(57) ABSTRACT

A steering locking system is provided for a motor vehicle that includes a pin, a locking disc to receive the pin, an actuation device, and a control unit. The actuation device is configured to control movement of the pin. The control unit is configured to control rotation of the locking disc and movement of the pin via the actuation device. Further, the control unit is configured to permit movement of the pin into the pocket after the occurrence of a predetermined event. The steering locking system can further include a motor operatively associated with the locking disc. The control unit may be configured to control the motor at a first power level to maintain the motor in a state of readiness and to control the motor at a second power level, different from the first power level, when the locking system detects a torque applied to the steering system.

28 Claims, 6 Drawing Sheets

(56) References Cited

U.S. PATENT DOCUMENTS

| | | | | |
|---|---|---|---|---|
| 8,662,242 B2* | 3/2014 | Yamakawa | ............ | B62D 5/008 |
| | | | | 180/443 |
| 2005/0263971 A1* | 12/2005 | Turner | ................... | B62D 5/008 |
| | | | | 280/89.11 |
| 2014/0349930 A1 | 11/2014 | Sah | | |

* cited by examiner

STEERING SYSTEMS INCLUDING LOCKING CONTROLS FOR A MOTOR VEHICLE, AND MOTOR VEHICLES INCLUDING STEERING SYSTEMS

TECHNICAL FIELD

The present disclosure relates to steering systems for motor vehicles including steering lock controls, and motor vehicles including steering systems having such lock controls.

BACKGROUND

Conventional motor vehicles may include an adaptive steering system that may add and subtract an angle between the driver steering wheel input and the steering gear input shaft. An adaptive system may provide enhanced performance at low speeds, such as during parking, and enhanced directional stability at high speeds, such as by using a variable gear ratio. An adaptive steering system may include a locking unit to lock the front steering system of the motor vehicle. The locking unit may provide a mechanical connection between the steering wheel and wheels during power-off of the steering system (i.e., before and/or after shutting down the engine) and may provide a means to lock the steering in case of a failure in the steering system.

Adaptive steering systems have already contributed to significant improvements in controlling an angle input by a driver to a steering wheel and an angle output by the steering gear input shaft, while providing a degree of safety with the locking unit of the steering system. However, adaptive steering systems tend to produce noise when the locking unit is engaged, such as when a motor vehicle is shut down. Such noise may be objectionable to a user but challenging to manage due to the nature of the locking unit and its close proximity to a driver. A past solution to this issue used soft materials to cushion the locking unit and dampen sound created by the locking unit. Another solution uses noises created by events, such as the engine shutting off or other sounds created by the vehicle, to mask the noise created by the locking unit but this increased the overall noise of the vehicle at shut down. Other solutions included maintaining full power to the adaptive steering system and after engine shut off so the locking unit remains unlocked, but this would require high power consumption from the vehicle battery, such as when a driver applied a torque to the steering wheel (e.g., as an aid to exit the vehicle) while the engine was shut off.

In view of these considerations, further improvements may be made to steering systems for motor vehicles so a noise made by locking units of the steering systems is less objectionable for a user of a motor vehicle.

SUMMARY

In accordance with various exemplary embodiments, the present disclosure provides a steering locking system for a motor vehicle. The steering locking system comprises a pin, a locking disc, an actuation device, and a control unit. The locking disc may include at least one pocket configured to receive the pin. The actuation device may be configured to control movement of the pin. The control unit may be configured to control rotation of the locking disc and movement of the pin via the actuation device. Further, the control unit may be configured to permit movement of the pin into the pocket after the occurrence of a predetermined event.

In accordance with various exemplary embodiments, the present disclosure provides a steering locking system for a motor vehicle. The steering locking system comprises a pin, a locking disc, an actuation device, a motor, and a control unit. The locking disc may include at least one pocket configured to receive the pin. The actuation device may be configured to control movement of the pin. The motor may be operatively associated with the locking disc. The control unit may be configured to communicate with the motor, wherein the motor is configured to rotate the locking disc relative to the pin based on signals received from the control unit. The control unit may be configured to control the motor at a first power level to maintain the motor in a state of readiness and to control the motor at a second power level, different from the first power level, when the locking system detects a torque applied to the steering system.

In accordance with various exemplary embodiments, the present disclosure provides a method of controlling a locking unit of a steering system of a motor vehicle. The method comprises receiving, at a control unit of the locking unit, a signal indicative of an engine of the motor vehicle shutting down. The method further comprises controlling, via the control unit, positioning of a pin relative to at least one pocket of a locking disc, to prevent the pin being placed into the at least one pocket until after the occurrence of a predetermined event.

In accordance with various exemplary embodiments, the present disclosure provides a method of controlling a locking unit of a steering system of a motor vehicle. The method comprises receiving, at a control unit of the locking unit, a signal indicative of an engine of the motor vehicle shutting down. The method further comprises controlling, via the control unit, power to a motor operatively associated with the locking unit. Controlling the power may include powering the motor at a first power level to maintain the motor in a state of readiness during a first stage of a locking process and powering the motor at a second power level, different from the first power level, to resist torque applied to the steering system during the first stage of the locking process.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the invention are explained in detail below using an exemplary embodiment illustrated in the following figures. In the figures.

DESCRIPTION OF THE EMBODIMENTS

Figure 1:
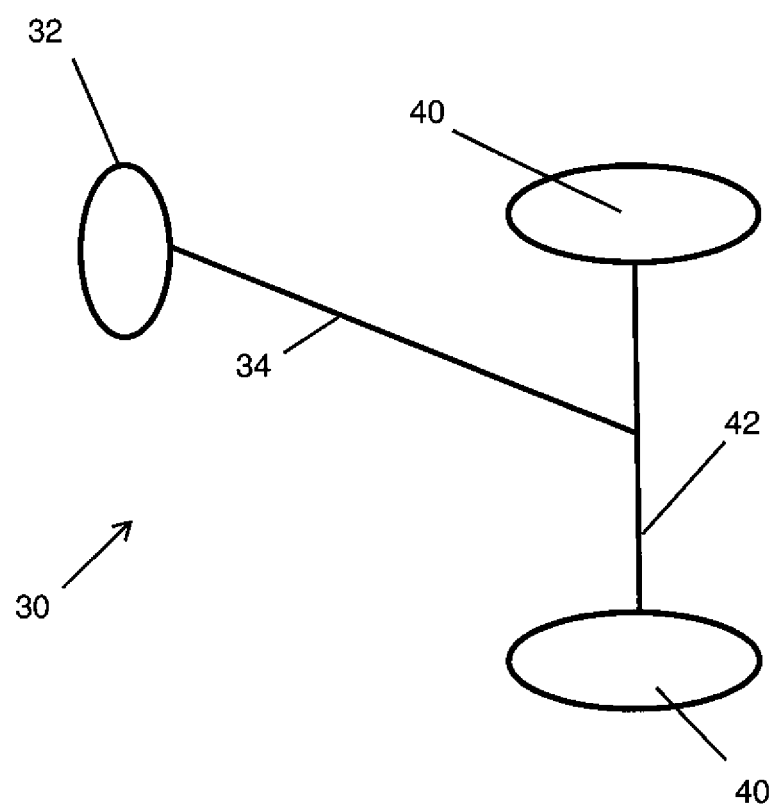
FIG. 1 schematically depicts a steering column in a vehicle, in accordance with the present disclosure.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

It is to be noted that the features individually mentioned in the following description can be combined with each other in any technically meaningful manner and reveal further embodiments of the invention.

The various exemplary embodiments described herein contemplate a steering system for a motor vehicle. The steering system may be an adaptive steering system for a steering column of a motor vehicle. In accordance with an aspect of the present disclosure, a locking unit for locking the steering system includes a mechanism configured to control the timing of the locking process. For example, in accordance with one exemplary embodiment, the locking unit may include a locking disc with a pocket and a pin to be received in the pocket of the locking disc during a locked state of the steering system. Reception of the pin in the pocket may be delayed until the occurrence of a predetermined event after an engine of the motor vehicle that includes the steering system has been shut down. By delaying receiving of the pin in the pocket, the driver is provided time to exit the motor vehicle, which minimizes the opportunity of the driver to hear noise created by the pocket receiving the pin during the locking process.

The steering system may also include a control unit to control a rotational position of the locking disc relative to the pin so that a contact point between the locking disc and the pin may be controlled. For example, the locking disc may be rotated relative to the pin so the pin is positioned such that it will not be received in the pocket of the locking disc when the engine is shut off until a predetermined event has occurred (e.g., a certain amount of time has passed or other event). In this manner, a noise created when the pin is received in a pocket is not created at the time of engine shut off. When the predetermined event has occurred, the locking disc may be rotated so the pin is received within a pocket in order to complete the locking process of the steering system. The steering system may control the pin to contact a plateau of a locking disc in a first stage of a locking process and maintain a position of the locking disc relative to the pin so the steering system is maintained in the first stage, such as to delay locking until the predetermined event has occurred. For example, a control unit may control power to a motor that actuates the locking disc to resist a torque in the steering system, such as due to a torque applied to a steering wheel, and maintain the position of the pin in the first stage of the locking process (e.g., on the plateau). According to an exemplary embodiment, during the first stage of the locking process, the control unit may maintain the motor at a first, low level of power to maintain the motor in a state of readiness and increase the power to a second, higher level of power as needed to resist the torque. Further, the second level of power may have a first, low value when an engine of a motor vehicle is off and a second, high value when the engine is on.

Turning to FIG. 1, a steering system 30 for a motor vehicle is schematically depicted, according to an exemplary embodiment. The steering system 30 includes a steering wheel 32 and a steering column 34 connected to an axle 42, which is in turn connected to wheels 40 of the motor vehicle. The steering system 30 may be an adaptive steering system, which may, for example, add and subtract an angle between input to the steering wheel 32 and an input shaft (not shown) of the steering column 34.

Figure 2:
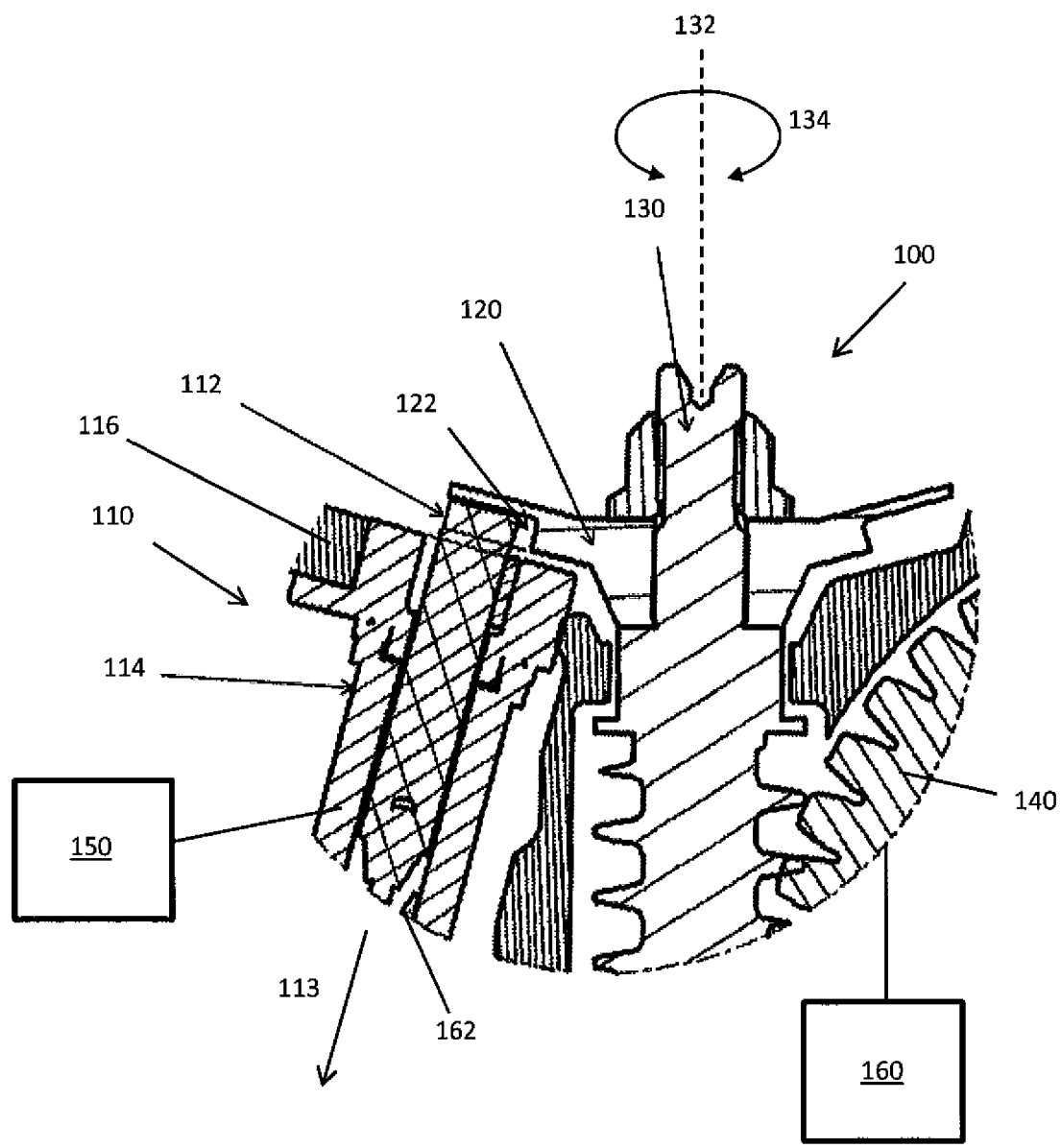
FIG. 2 depicts a partial sectional view of components of a steering system, according to an exemplary embodiment of the present disclosure.

FIG. 2 depicts a sectional view of an exemplary embodiment of a portion of a steering system 100, such as an adaptive steering system described above with regard to FIG. 1. System 100 includes a locking unit 110, a locking disc 120, and a motor 160 coupled to locking disc 120 via a gear 140 and a motor shaft 130, as shown in the exemplary embodiment of FIG. 2. As will be described below, motor 160 may be used to actuate gear 140, which in turn moves shaft 130 and causes locking disc 120 to rotate along directions 134 about shaft axis 132 in FIG. 2. According to an exemplary embodiment, locking unit 110 is connected to the steering column of a motor vehicle via an armature 116 that the locking unit 110 is coupled to.

Figure 3:
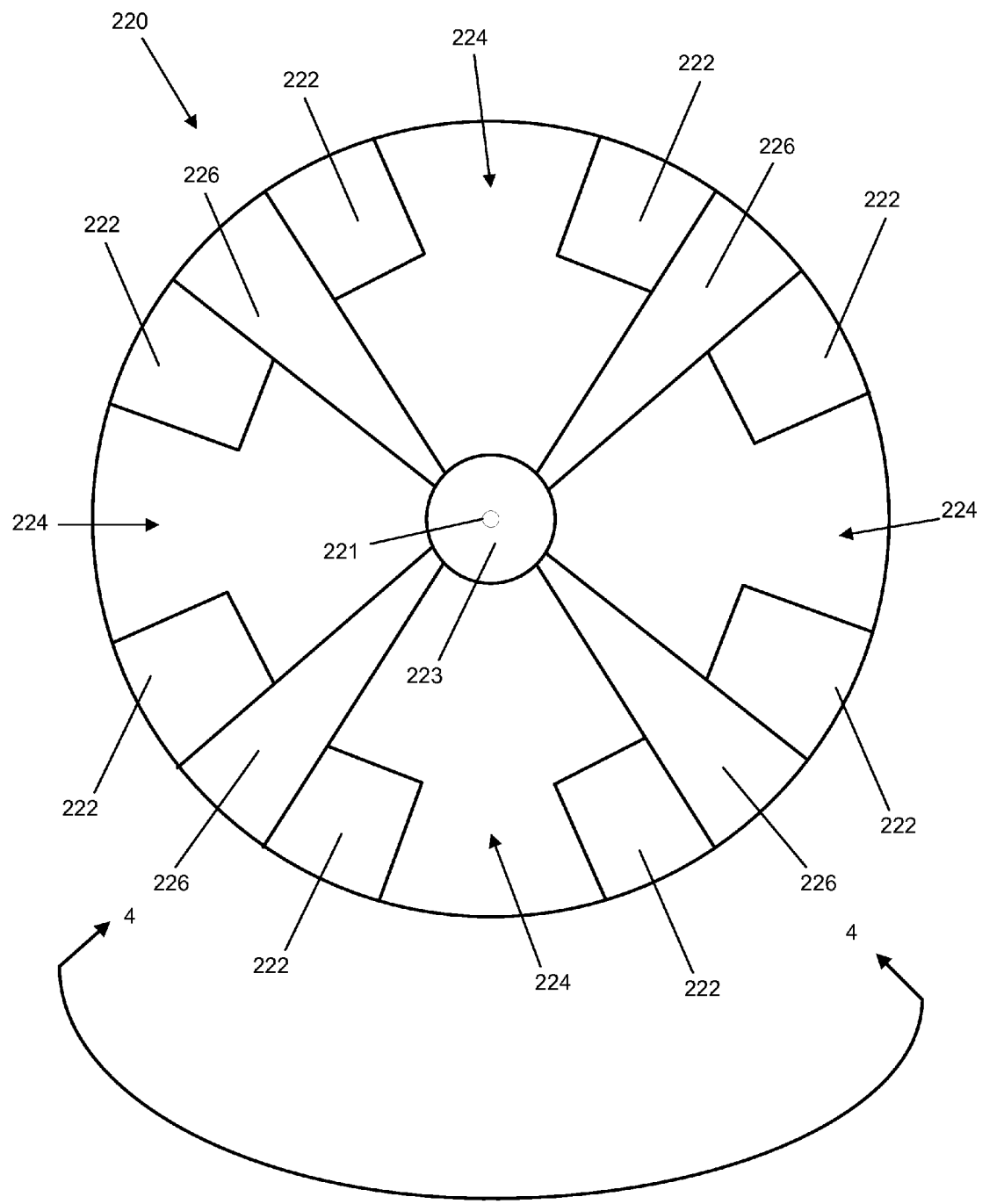
FIG. 3 depicts a top view of a locking disc of a steering system, in accordance with an exemplary embodiment of the present disclosure.

Locking unit 110 includes a pin 112 and a pin actuation device 114 to move pin 112. Locking disc 120 may include a plurality of pockets 122 to receive pin 112 of locking unit 110. As shown in the exemplary embodiment of FIG. 3, a locking disc 220 may include a plurality of pockets 222 to receive a pin of a locking unit, with the pockets 222 radially located with respect to an axis 221 (which corresponds to axis 132 in FIG. 2) about which disc 220 rotates along directions 226. Further, locking disc 220 may include plateaus 224 located between pockets 222 and shoulders, as shown in the exemplary embodiment of FIG. 3. As depicted in the exemplary embodiment of FIG. 3, locking disc 220 can include a central aperture 223 through which a motor shaft (e.g., motor shaft 130 of FIG. 2) can extend. Pockets 222 may be arranged in pairs, with a plateau 224 located between the pockets 222 of the pair and a shoulder 226 on either side of the pockets 222 of the pair, as shown in the exemplary embodiment of FIG. 3. Although locking disc 220 is depicted as having eight pockets 222 in the exemplary embodiment of FIG. 3, the present disclosure contemplates locking discs having various numbers of pockets 222, such as, for example, two, four, six, eight, ten, or more pockets.

Locking unit 110 may be configured to bias pin 112 into a locking position (depicted in FIG. 2) within a pocket 122 of locking disc 120 to lock the steering system 100 against rotation about axis 132. For example, locking unit 110 may include, for example, a spring (not shown) that biases pin 112 into the position depicted in FIG. 2. Pin actuation device 114 may be configured to resist and/or overcome the biasing force applied by the locking unit 110 so that the pin 112 may be withdrawn from pocket 122 along direction 113 in FIG. 2. According to an exemplary embodiment, pin actuation device 114 is a solenoid, which may be controlled by an electronic control unit (ECU) 150. For example, ECU 150 may control pin actuation device 114, such as when pin actuation device 114 is a solenoid, using pulse width modulation signals. ECU 150 may be in signal communication with a sensor 162 that is used to determine a position of pin 112, as described in the exemplary embodiments of U.S. application Ser. No. 14/077,600, entitled "Active Front Steering System Lock," filed on Nov. 12, 2013, which is hereby incorporated by reference in its entirety.

The steering system 100 may be configured to minimize or eliminate noise caused during locking of the steering system 100. According to an exemplary embodiment, ECU 150 may be configured to control the rate of movement of pin 112 in order to minimize or eliminate the amount of noise pin 112 makes when contacting locking disc 120, such as by controlling a rate of movement of pin 112 that would otherwise occur due to the locking unit 110 biasing the pin 112 to the locking position of the pin 112. Thus, the ECU 150 may control pin actuation device 114 so the pin 112 contacts locking disc 120 at a lower speed than would otherwise occur due to only the biasing effect of the locking unit 110. For example, ECU 150 may control pin actuation device 114 to control the movement of pin 112 as described in the exemplary embodiments of U.S. application Ser. No. 14/077,600, entitled "Active Front Steering System Lock," filed on Nov. 12, 2013, which is hereby incorporated by reference in its entirety. ECU 150 may be a stand-alone controller or may be a part or section of a multi-purpose controller, such as, for example, an engine control module or other motor vehicle control module (not shown).

Figure 4:
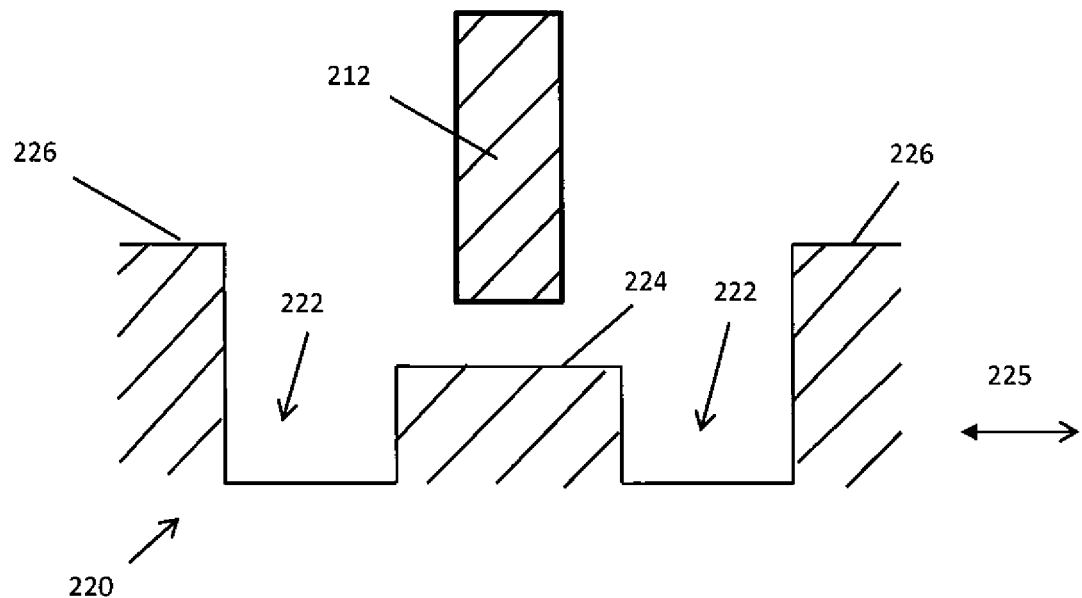
FIG. 4 is a sectional view of FIG. 3, depicting a pin and locking disc of a steering system in an unlocked state, in accordance with an exemplary embodiment of the present disclosure.

To facilitate minimization or elimination of noise caused during locking, the steering system 100 may be configured to control a rotational position of the locking disc 120 in order to control a location where pin 112 contacts locking disc 120. Turning to FIGS. 4-7, an operation of controlling a rotational position of the locking disc will be described. FIG. 4 depicts a side sectional view of a locking disc 220, such as along lines 4-4 in FIG. 3, as well as a pin 212 of a locking unit (e.g., locking unit 110 of FIG. 2) in an unlocked state. For example, pin 212 may be retracted to the position depicted in FIG. 4 by a locking unit (e.g., locking unit 110 of FIG. 2) so that pin 212 is not in contact with locking disc 220. In this state, locking disc 220 may be rotated, which is represented as movement along directions 225 in FIG. 4, to position locking disc 220 relative to pin 212. For example, motor 160 may be activated, such as via a signal from ECU 150, to actuate motor 140 and turn shaft 130 to rotate locking disc 120 about axis 132 in FIG. 2. ECU 150 may detect a position of locking disc 220 relative to pin 212 via one or more sensors, such as via a rotary encoder (not shown) connected to shaft 130 and in signal communication with ECU 150, a Hall effect sensor, or other type of sensor, to facilitate positioning of locking disc 220 relative to pin 212 via the ECU 150, according to an exemplary embodiment.

Figure 7:
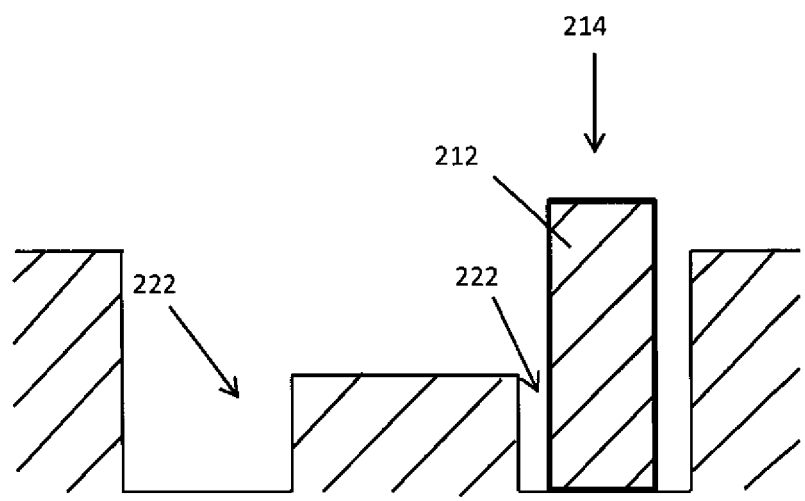
FIG. 7 depicts the pin and locking disc of FIG. 4 in a second stage of a locking process.

According to an exemplary embodiment, locking disc 220 may be rotated relative to pin 212 along directions 225 so that pin 212 is positioned above a pocket 222 of disc 220 in order to drop pin 212 into pocket 222, as shown in FIG. 7. Movement of pin 212 into pocket 222 may be controlled, such as according to the exemplary embodiments of U.S. application Ser. No. 14/077,600, entitled "Active Front Steering System Lock," filed on Nov. 12, 2013, which is hereby incorporated by reference in its entirety. As a result, the noise caused by pin 212 contacting the locking disc 220 (e.g., the bottom surface of a pocket 222), is minimized or reduced by controlling the rate of movement of the pin 212.

Figure 5:
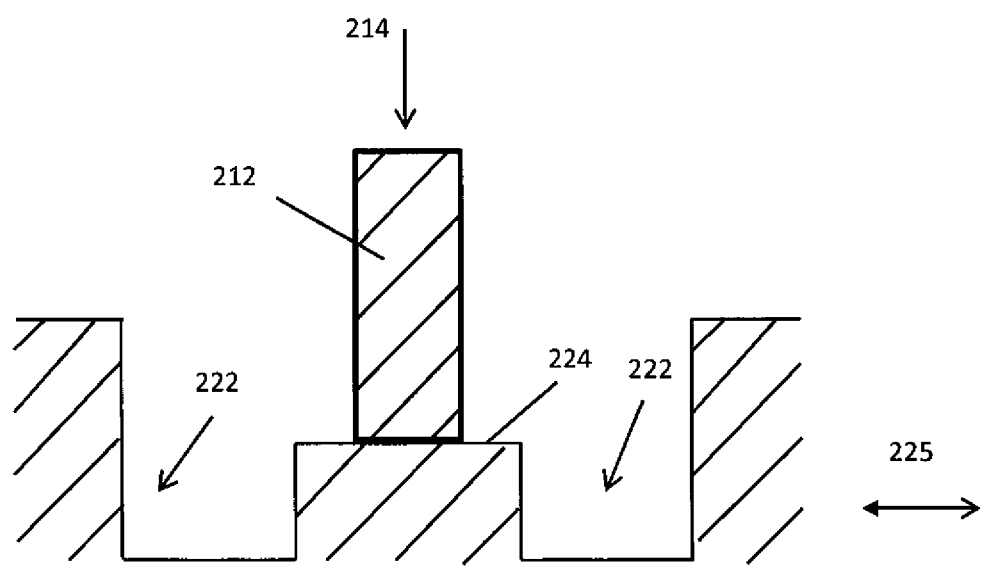
FIG. 5 depicts the pin and locking disc of FIG. 4 in an engaged state.

According to an exemplary embodiment, locking disc 220 may be rotated along directions 225 so that pin 212 is positioned above a plateau 224 of locking disc 220 that is located between pockets 220, as depicted in FIG. 4. As a result, a distance that pin 212 moves before pin 212 contacts locking disc 220 is reduced, which facilitates reducing the noise made by pin 212 contacting disc 220. Subsequently, pin 212 may be controlled to move along direction 214, such as according to the exemplary embodiments of U.S. application Ser. No. 14/077,600, entitled "Active Front Steering System Lock," filed on Nov. 12, 2013, which is hereby incorporated by reference in its entirety, and contact plateau 224, as depicted in FIG. 5. By contacting pin 212 with plateau 224 of locking disc 220, less power may be used by the pin actuation device 114 (e.g., solenoid) because the pin 212 travels over a shorter distance than when the pin 212 is dropped into a pocket 222, while also minimizing or reducing noise created by the pin 212 contacting the locking disc 220.

As shown in FIGS. 3-7, locking disc 220 may include shoulders 226 on either side of plateau 224 and pockets 222, according to an exemplary embodiment. Shoulders 226 may have a greater vertical height (e.g., along a direction substantially parallel to a longitudinal axis of pin 212) than plateau 224, as shown in the exemplary embodiment of FIGS. 4-7. When pin 212 is in contact with plateau 224, a degree of safety is provided because if locking disc 220 is rotated along directions 225, such as due to a torque being applied to the steering wheel of the vehicle, pin 212 may contact a shoulder 226, such as a sidewall 227 of a shoulder 226 (shown in FIG. 6), to prevent pin 212 from passing over a pocket 222 when the locking disc 220 is rotated along direction 229. Thus, the rotation of locking disc 220 is stopped with pin 212 positioned above a pocket 222 when the pin 212 and shoulder 226 engage, permitting the pin 212 to drop into the pocket 222. As a result, rotation of the locking disc 220, as well as steering for the vehicle, is limited when pin 212 is engaged with plateau 224 but not inserted into a pocket 222.

When pin 212 is in contact with plateau 224, as depicted in FIG. 5, a system including pin 212 and locking disc 220 may be considered to be in a first stage of a locking process. It may be desirable in some circumstances to maintain the position of the pin 212 in contact with the plateau 224 (e.g., a first stage of a locking process for a steering system). For example, a second locking stage, in which disc 220 is moved so pin 212 drops into a pocket 222, as shown in FIG. 7, may be delayed until a later time to minimize or prevent the a user from hearing any noise created by dropping pin 212 into pocket 222, as will be described in detail below. For instance, if a driver shuts down a motor vehicle but remains with the vehicle after shutting the vehicle down, it may be desirable to delay the second stage of dropping the pin 212 into a pocket 222 while the driver is present, because the second locking stage could create a noise that is objectionable to the driver.

In view of these considerations, a steering system may be configured to maintain pin 212 and locking disc 220 in the first stage of a locking process for a period of time. According to an exemplary embodiment, movement of locking disc 220 along directions 225 in FIG. 5 (e.g., via rotation of the locking disc about its axis), such as due to torque applied to a steering wheel by a driver, may be resisted. Resisting movement of locking disc 220 may prevent dropping of pin 212 into a pocket 222, which could produce an objectionable noise and may also minimize or prevent an uncomfortable feeling by the driver that the steering system feels loose or imprecise in its movements.

According to an exemplary embodiment, a motor (e.g., motor 160 in FIG. 1) connected to locking disc 220 may be configured to resist movement of locking disc 220 by applying a torque to locking disc 220 in response to application of a torque to locking disc 200, for example via a steering wheel, the responsive torque being applied in a direction opposite to the torque applied via the steering wheel. For example, ECU 150 in FIG. 2 may be in communication with one or more sensors that detect movement of the locking disc 220 or a torque applied to the locking disc 220. ECU 150, for example, may be in communication with a torque sensor and when a torque applied to the steering wheel meets or exceeds a torque of, for example, about 10 N-m or more, ECU 150 responds by increasing the power supplied to the motor (e.g., motor 160) to apply a torque to provide a degree of resistance to movement of the locking disc 220. According to an exemplary embodiment, the motor may use a first power level (e.g., a baseline current) so the motor is in a state of readiness, with the first power level being increased to a second power level to resist movement of the locking disc, such as due to a torque applied via the steering wheel. Such a state of readiness, in which the motor is powered, can provide a firm feeling for the steering of a vehicle so that the steering does not feel loose or imprecise in its movements.

According to another exemplary embodiment, the increased, second level of power may have different values, depending upon whether the engine of a vehicle is on or off. The different values for the second level of power may be utilized to minimize consumption of battery power when the engine is off. For example, the second level of power may have a first value when the engine is on and a second value when the engine is off, with the second value being less than the first value. For instance, the second level of power supplied to the motor connected to locking disc 220 may have a first value of, for example, about 40 amps at 12 volts when the vehicle engine is on. In contrast, when the engine is off, the second level of power may have a second value of, for example, about 5 amps at 12 volts. To maintain the motor connected to the locking disc in a state of readiness, the first level of power may be, for example, about 0.3-1 amps at 12 volts when the engine is off. Because the second value of the second level of power supplied to the motor connected to locking disc 220 is low, a torque applied to the locking disc 220, such as via the steering wheel, may be greater than a torque supplied by the motor. This can be acceptable because when the engine is off the locking unit can be in the first stage of the locking process, in which pin 212 has been dropped onto a plateau, as discussed above with regard to the exemplary embodiment of FIG. 5. If, for example, a large torque is applied to the steering wheel that overcomes resistance provided by the motor for the locking disc 220, due to the second power level supplied to the motor, the locking disc 220 could rotate and permit pin 212 to drop into a pocket 222, as depicted in FIGS. 6 and 7, which would advance the locking process to the second stage and maintain the mechanical integrity of a steering system including the locking system.

By using a relative low baseline current, the motor may require little power when the vehicle engine is off while pin 212 and locking disc 222 remain in the first stage of a locking process. As a result, little power is drained from the electrical system (e.g., battery) of a motor vehicle when the vehicle engine is shut down and the first stage may be maintained for a period of time. Further, the second level of power may be used to provide a degree of resistance to a torque applied to a steering wheel but the second level of power is lower than when the vehicle engine is off in order to minimize the amount of power drained from the vehicle's electrical system. Thus, the first and second levels of power provide an efficient use of electrical power so the motor is in a state of readiness and can provide a degree of resistance to a torque applied to a steering wheel, while also maintaining mechanical integrity of the steering system by engaging the locking system in the first stage of the locking process (e.g., engaging pin 212 with plateau 224). According to an exemplary embodiment, the first stage of the locking process depicted in FIG. 5 may be maintained when a constant torque of about 10 N-m or more is being applied to the steering wheel for a period of about 3 minutes to about 5 minutes, such as when accessories of the motor vehicle, such as a radio, remain off.

The various exemplary embodiments described herein further contemplate engaging a second stage of a locking process, such as via moving pin 212 into a pocket 222 of locking disc 220, at a later time after a motor vehicle has been shut down. By delaying dropping of pin 212 into a pocket 222 to a later time, any noise created by engaging the second stage of the locking process may be missed by a driver because the driver has exited the motor vehicle. The second stage may be initiated, for example, by the motor rotating the disc 220 along direction 229 about an axis of disc 220 so pin 212 is aligned with a pocket 222, as shown in FIG. 6.

Figure 6:
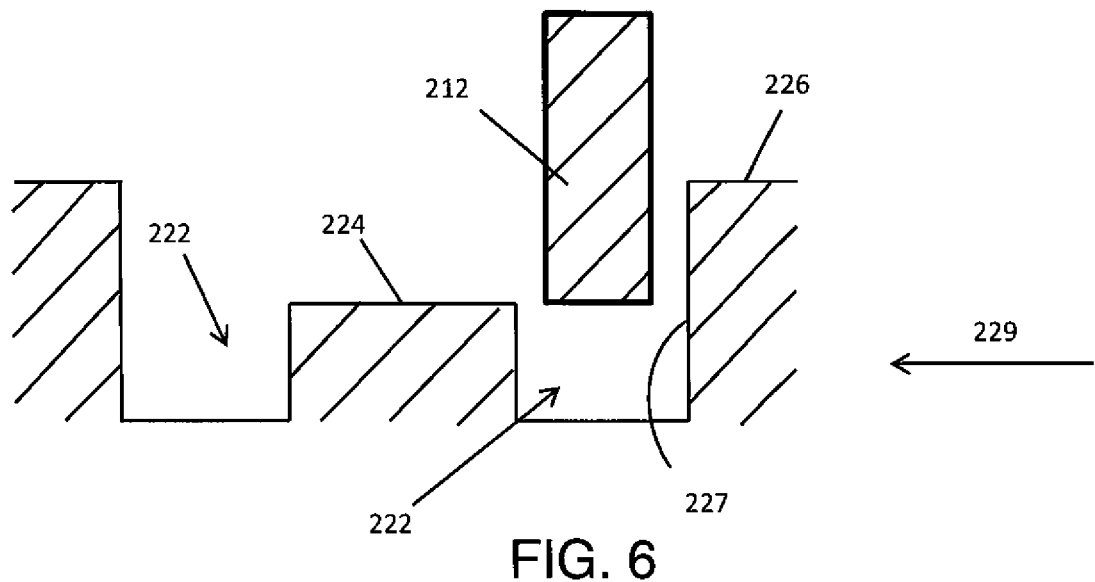
FIG. 6 depicts the pin and locking disc of FIG. 4 in a first stage of a locking process.

According to an exemplary embodiment, when locking disc 220 is moved along direction 229 in FIG. 6, pin 212 may engage shoulder 226, such as sidewall 227 of shoulder 226, to confirm that pin 212 is positioned above a pocket 222, as depicted in FIG. 6 (although contact is not shown between pin 212 and shoulder 226 in the drawings, contact may occur between the two). Although the contact between the pin 212 and the sidewall 227 may confirm that the pin 212 is properly positioned for dropping into a pocket 222, the contact may create an objectionable noise. Therefore, a noise may be created not only when pin 212 is dropped into pocket 222 and contacts the disc 220, but when disc 220 is rotated to align pin 212 with a pocket 222, resulting in contact between the sidewall 227 and pin 212. As a result, the various exemplary embodiments described herein are not necessarily limited to contact between pin 212 and the bottom of a pocket 222, but may include contact between the sidewall 227 and pin 212 as well as contact between the pin 212 and the bottom of a pocket 222. In view of these considerations, it may be desirable to delay engagement of the second stage of the locking process after the vehicle has been shut down to minimize or avoid detection of any noise generated engagement of the second state.

The various exemplary embodiments described herein contemplate engagement of the second stage of the locked state (e.g., dropping a pin into a pocket of a locking disc) when an event occurs after the engine of a motor vehicle has been shut down. According to an exemplary embodiment, the event is the opening of a door of the vehicle, such as, for example, the driver's door. A door sensor may be in signal communication with the ECU 150 of FIG. 2, which in turn controls the motor 160 to rotate a locking disc (120, 220) so the pin (112, 212) is positioned to drop within a pocket (122, 222) of the locking disc, as shown in FIGS. 6 and 7.

According to another exemplary embodiment, the event is the closing of a door of the vehicle, such as, for example, the driver's door.

The various exemplary embodiments described herein contemplate other events for initiating the second stage of the locking process. For example, the activation of a security system of a motor vehicle and/or door locks by a user may be used as an event to trigger engagement of the second stage. In another example, the ECU of the steering system may be in signal communication with weight sensors in one or more seats of the motor vehicle. When a weight sensor in the driver seat no longer detects a weight or no longer detects a weight greater than a predetermined threshold (e.g., transitions from detecting a weight greater than a predetermined threshold to not detecting the weight greater than the predetermined threshold), the ECU may initiate the second stage to drop the pin within a pocket of the locking disc, either immediately or after a predetermined amount of time to permit the driver to exit the vehicle before engaging the second stage of the locking process. Seat weight sensors other than the sensor in the driver's seat may also be used, such as when all seat weight sensors no longer detect a weight or transition from detecting a weight greater than a predetermined threshold to not detecting the weight greater than the predetermined threshold. The various exemplary embodiments described herein contemplate other events for triggering the second stage of the locking process and are not limited to the various examples described herein.

The various exemplary embodiments described herein further contemplate initiating the second stage of the locking process after a predetermined period of time has occurred, such as when no event has occurred that otherwise initiates the second stage. For example, if a sensor indicates that the driver has not exited the motor vehicle, the ECU may wait for the predetermined time to lapse before engaging the second stage so that the steering system is in a fully locked state. For instance, if the driver seat weight sensor detects a weight, a vehicle accessory (e.g., radio) is on, the driver's door has not been opened, the security system or door locks have not been engaged, or other event contemplated by the various exemplary embodiments described herein has not occurred within a predetermined amount of time, the ECU proceeds with initiating the second stage of the locking process after the predetermined amount of time has lapsed.

The various exemplary embodiments described herein further contemplate canceling delay of the second stage of the locking process (e.g., waiting for the predetermined event). For example, the steering system (e.g., ECU 150) may cancel the delay when the battery of the motor vehicle has a low charge (e.g., is at a baseline level).

Figure 8:
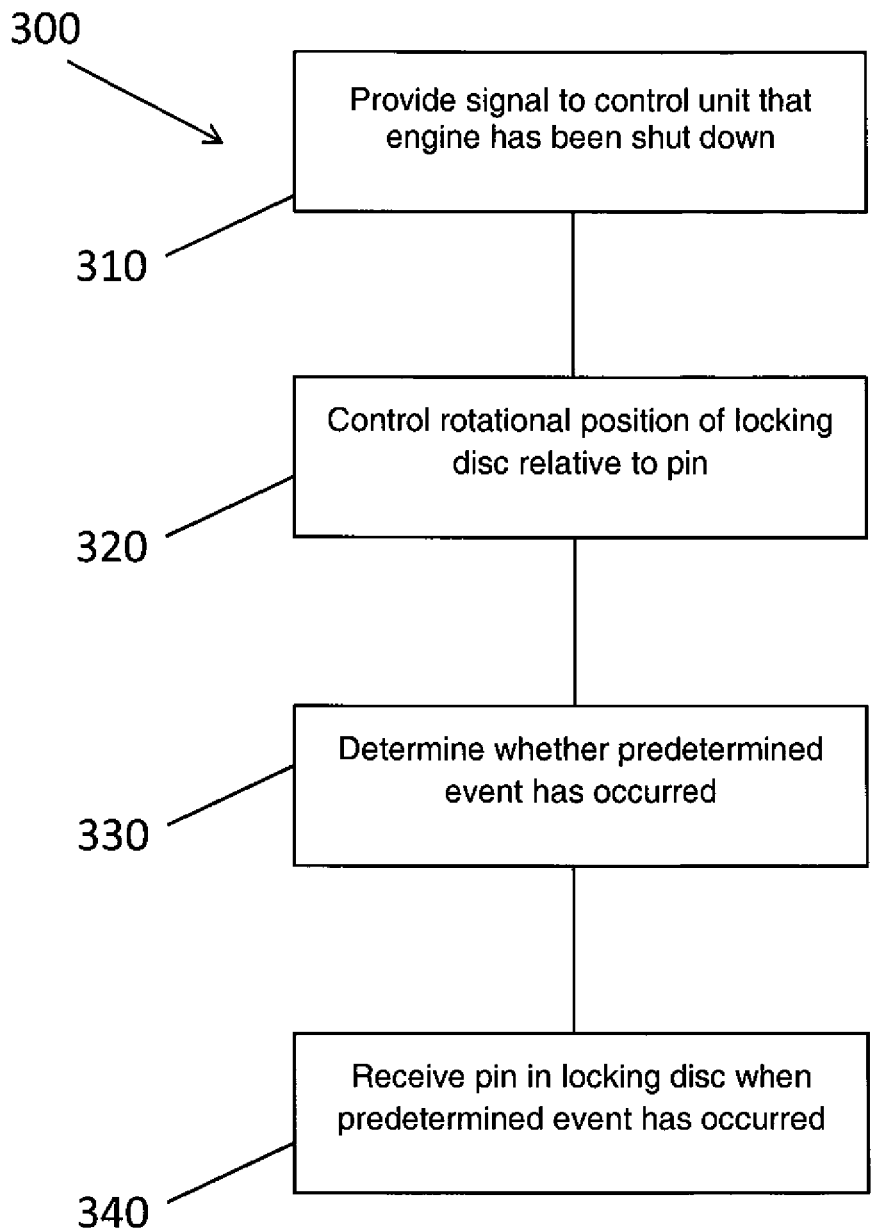
FIG. 8 depicts a method of engaging a locking unit of a steering system of a motor vehicle, in accordance with an exemplary embodiment of the present disclosure.

FIG. 8 depicts an exemplary embodiment of a method 300 of controlling a locking unit of a steering system, in accordance with the disclosure of this application. In step 310, a signal is provided to a control unit of the steering system that an engine of a motor vehicle has been shut down. In step 320, the control unit controls the rotational position of a locking disc of the steering system relative to a pin of the steering system. In step 330, the control unit determines whether a predetermined event has occurred after the control unit received the signal that the engine was shut down. When the predetermined event has not occurred, the control unit delays receiving the pin in a pocket of the locking disc and continues to do so until the predetermined event has occurred. Once the predetermined event has occurred, in step 340 the control unit receives a signal indicating that the predetermined event has occurred and the control unit permits the pin to be received in the pocket of the locking disc.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A steering locking system, comprising:
   a pin;
   a locking disc comprising first and second pockets adjacent to and separated by a plateau and configured to receive the pin; and
   a control unit configured to control rotation of the locking disc and movement of the pin via an actuation device,
   wherein the control unit is configured to move the pin into one of the first and second pockets after the occurrence of a predetermined event.

2. The locking system of claim 1, wherein, during a first stage of a locking process, the control unit is configured to control rotation of the locking disc relative to the pin so the pin engages the plateau of the locking disc between the first and second pockets of the locking disc.

3. The locking system of claim 2, further comprising a motor operatively associated with the locking disc, wherein the motor is configured to receive signals from the control unit and to rotate the locking disc relative to the pin based on the received signals.

4. The locking system of claim 3, wherein, in the first stage of the locking process, and prior to occurrence of the predetermined event, the control unit is configured to control power supplied to the motor in order to resist movement of the locking disc relative to the pin.

5. The locking system of claim 4, wherein the control unit is configured to control the power supplied to the motor to provide a second torque in a direction opposite to a first torque applied to a steering wheel of the steering system that causes the movement of the locking disc relative to the pin.

6. The locking system of claim 2, wherein, after occurrence of the predetermined event, the control unit controls rotation of the locking disc relative to the pin so one of the first and second pockets is aligned with the pin to initiate a second stage of the locking process in which the pin is received within the pocket the pin is aligned with.

7. The locking system of claim 1, wherein the predetermined event includes one of: opening a driver's door of a motor vehicle including the locking system, closing the driver's door, activation of a security system of the motor vehicle, engagement of door locks of the motor vehicle, and a weight sensor in a driver seat of the motor vehicle transitioning from detecting a weight greater than a predetermined threshold to not detecting the weight greater than the predetermined threshold.

8. The locking system of claim 1, wherein the predetermined event is a passing of a predetermined amount of time after an engine of a motor vehicle including the locking system has been shut down.

9. The locking system of claim 1, wherein the actuation device comprises a solenoid.

10. The locking system of claim 1, wherein the control unit is configured to move the pin into the pocket prior to occurrence of the predetermined event when a battery of a motor vehicle having the locking system is at a baseline level.

11. An adaptive steering system for a motor vehicle, comprising a steering column and the locking system of claim 1.

12. A steering locking system for a motor vehicle, comprising:
    a pin;
    a locking disc comprising at least one pocket configured to receive the pin;
    an actuation device configured to control movement of the pin;
    a motor operatively associated with the locking disc; and
    a control unit configured to communicate with the motor, wherein the motor is configured to rotate the locking disc relative to the pin based on signals received from the control unit;
    wherein the control unit is configured to control the motor at a first power level to maintain the motor in a state of readiness and to control the motor at a second power level, different from the first power level, when the locking system detects a torque applied to the steering system.

13. The locking system of claim 12, wherein the control unit is configured to control power to the motor at the first power level when the locking disc does not move relative to the pin and, when the locking system detects the torque applied to the steering system, the control unit is configured to control the power to the motor at the second power level to control rotation of the locking disc so that movement of the locking disc relative to the pin is resisted, and
    wherein the second power level is greater than the first power level and the second power level is less when an engine of the motor vehicle is off than when the engine is on.

14. The locking system of claim 13, wherein the control unit is configured to control the power to the motor at the second power level to provide a second torque in a direction opposite to a first torque applied to a steering wheel of the steering system that causes the movement of the locking disc relative to the pin.

15. The locking system of claim 12, wherein the at least one pocket of the locking disc comprises two pockets having bottoms with a first height,
    wherein the locking disc comprises a plateau between the two pockets, the plateau having a second height greater than the first height,
    wherein the locking disc further shoulders laterally to the two pockets, the shoulders having a third height, wherein the third height is greater than the first and second heights.

16. The steering locking system of claim 12, wherein the control unit is configured to control the rotation of the locking disc in the first stage of the locking process to prevent the pin moving into the pocket until the occurrence of a predetermined event.

17. The locking system of claim 16, wherein the predetermined event includes one of: opening a driver's door of a motor vehicle including the locking system, closing the driver's door, activation of a security system of the motor vehicle, engagement of door locks of the motor vehicle, and a weight sensor in a driver seat of the motor vehicle transitioning from detecting a weight greater than a predetermined threshold to not detecting the weight greater than the predetermined threshold.

18. A method of controlling a locking unit of a motor vehicle steering system, comprising:

receiving, at a control unit of the locking unit, a signal indicative of an engine of a motor vehicle shutting down; and controlling, via the control unit, positioning of a pin relative to at least one pocket of a locking disc, to prevent the pin being placed into the at least one pocket until after the occurrence of a predetermined event.

19. The method of claim 18, wherein the at least one pocket of the locking disc comprises two pockets and, further comprising, during a first stage of a locking process, controlling rotation of the locking disc relative to the pin via the control unit so the pin engages a plateau of the locking disc located between the two pockets.

20. The method of claim 19, wherein controlling rotation of the locking disc includes powering a motor operatively associated with the locking disc.

21. The method of claim 20, further comprising controlling the motor at a first power level to maintain the motor in a state of readiness during a first stage of a locking process and controlling the motor at a second power level, different from the first power level, to resist torque applied to the steering system when the locking system detects a torque applied to the steering system during the first stage of the locking process.

22. The method of claim 21, wherein the second power level is greater than the first power level and the second power level has a first value when the engine is on and a second value when the engine is off, with the first value being greater than the second value, and wherein the control unit controls power to the motor at the first power level when the locking disc does not move relative to the pin and the control unit controls the power to the motor at the second power level to control rotation of the locking disc so that movement of the locking disc relative to the pin is resisted.

23. The method of claim 18, further comprising controlling rotation of the locking disc relative to the pin so the at least one pocket of the locking disc is aligned with the pin to initiate a second stage of the locked process during which the pin is moved into the at least one pocket after occurrence of the predetermined event.

24. The method of claim 18, wherein the predetermined event includes one of: opening a driver's door of the motor vehicle, closing the driver's door, activation of a security system of the motor vehicle, engagement of door locks of the motor vehicle, and a weight sensor in a driver seat of the motor vehicle transitioning from detecting a weight greater than a predetermined threshold to not detecting the weight greater than the predetermined threshold.

25. A method of controlling a locking unit of a steering system of a motor vehicle, comprising:

receiving, at a control unit of the locking unit, a signal indicative of an engine of the motor vehicle shutting down; and controlling, via the control unit, power to a motor operatively associated with the locking unit, wherein controlling power includes powering the motor at a first power level to maintain the motor in a state of readiness during a first stage of a locking process and powering the motor at a second power level, different from the first power level, to resist torque applied to the steering system during the first stage of the locking process.

26. The method of claim 25, wherein the second power level is greater than the first power level and the second power level is less when the engine of the motor vehicle is off than when the engine is on, and the control unit controls power to the motor at the first power level when a locking disc of the locking unit does not move relative to a pin of the locking unit, and, when the locking system detects the torque applied to the steering system, the control unit controls the power to the motor at the second power level to control rotation of the locking disc so that movement of the locking disc relative to the pin is resisted.

27. A steering locking system, comprising:
a pin;
a locking disc comprising at least one pocket configured to receive the pin;
solenoid configured to control movement of the pin; and
a control unit configured to control rotation of the locking disc and movement of the pin via the solenoid,
wherein the control unit is configured to permit movement of the pin into the pocket after the occurrence of a predetermined event.

28. A steering locking system for a motor vehicle, comprising:
a pin;
a locking disc comprising at least one pocket configured to receive the pin;
an actuation device configured to control movement of the pin; and
a control unit configured to control rotation of the locking disc and movement of the pin via the actuation device,
wherein the control unit is configured to permit movement of the pin into the pocket after the occurrence of a predetermined event, wherein the predetermined event includes one of: opening a driver's door of a motor vehicle including the locking system, closing the driver's door, activation of a security system of the motor vehicle, engagement of door locks of the motor vehicle, a weight sensor in a driver seat of the motor vehicle transitioning from detecting a weight greater than a predetermined threshold to not detecting the weight greater than the predetermined threshold, and a passing of a predetermined amount of time after an engine of a motor vehicle including the locking system has been shut down.

* * * * *